(12) United States Patent
Sun et al.

(10) Patent No.: US 11,119,754 B1
(45) Date of Patent: Sep. 14, 2021

(54) UPGRADING SYSTEM COMPONENTS WITH FORWARD AND BACKWARD COMPATIBILITY

(71) Applicant: Amazon Technologies, Inc., Seattle, WA (US)

(72) Inventors: Jiming Sun, Issaquah, WA (US); Tsung Ho Wu, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/837,530

(22) Filed: Apr. 1, 2020

(51) Int. Cl.
| | |
|---|---|
| *G06F 8/65* | (2018.01) |
| *G06F 9/455* | (2018.01) |
| *G06F 8/71* | (2018.01) |
| *G06F 8/61* | (2018.01) |
| *G06F 21/64* | (2013.01) |
| *G06F 9/4401* | (2018.01) |
| *G06F 16/901* | (2019.01) |
| *G06F 13/40* | (2006.01) |
| *G06F 9/30* | (2018.01) |

(52) U.S. Cl.
CPC ............. *G06F 8/65* (2013.01); *G06F 8/61* (2013.01); *G06F 8/71* (2013.01); *G06F 9/30029* (2013.01); *G06F 9/4401* (2013.01); *G06F 9/455* (2013.01); *G06F 13/4027* (2013.01); *G06F 16/9024* (2019.01); *G06F 21/64* (2013.01); *G06F 2213/0024* (2013.01)

(58) Field of Classification Search
USPC ........................................................ 717/170
See application file for complete search history.

(56) References Cited

U.S. PATENT DOCUMENTS

| | | | |
|---|---|---|---|
| 2018/0004505 A1* | 1/2018 | Annapureddy | G06F 8/654 |
| 2018/0204008 A1* | 7/2018 | Djabarov | G06F 8/65 |
| 2018/0293066 A1* | 10/2018 | Ali | G06F 9/4411 |
| 2019/0268420 A1* | 8/2019 | Acharya | H04L 63/0823 |

* cited by examiner

*Primary Examiner* — John Q Chavis
(74) *Attorney, Agent, or Firm* — Klarquist Sparkman, LLP

(57) ABSTRACT

An update process for updating components of one or more host devices includes selecting an update path for updating a system component of the one or more host devices and generating an update manifest including a plurality of update payloads for the system component that are included in the update path. The update path may be selected and/or derived based on a multi-stage combination of a hash of an update payload corresponding to a current version of the system component and respective hashes of the one or more update payloads using a reversible function to maintain backward and forward trackability and compatibility for the updates. A plurality of possible update paths may be represented in a directed graph that is managed by a control system. The update payloads may be uploaded to the host devices to cause the host devices to update the system component based on the update manifest.

20 Claims, 8 Drawing Sheets

UPGRADING SYSTEM COMPONENTS WITH FORWARD AND BACKWARD COMPATIBILITY

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Configuring the underlying systems and services used to host a computing service can be a challenging task. For example, underlying systems and services may have different sub-components that are able to be updated individually. However, updating these sub-components individually may introduce system bugs or interface mismatches due to mixed versions of the sub-components after multiple rounds of updating. Further, in order to address the complexity of updating an application or changing/updating the configuration of the underlying systems and services, an update or upgrade may be propagated to multiple systems in a batch mode. However, such a process may introduce additional opportunities for system bugs or interface mismatches if the systems have fallen out of synchronization with one another and are operating with different versions of sub-components at a time of updating/upgrading.

DETAILED DESCRIPTION

When compartmentalizing an integral piece of system software and allowing resulting sub-components to be updated individually, there is a risk of introducing system bugs or interface mismatches due to mixed versions of the sub-components after multiple updates. The disclosure provides mechanisms for updating one or more system components using a data structure that links all available updates with identifiers of the components, and that also includes a map of an upgrade path to allow individual components to trace the steps to optimize the update path and time. The data structure provides for ensuring interoperability and compatibility among these sub-components during the update process, rejecting incompatible components, and allowing a downgrade path when errors happen.

Current update processes, such as a BIOS LiveUpdate function, include a standalone software daemon running in a system management mode (SMM) (e.g., an X86 system management mode). The processes utilize system operating system (OS) software to interact with the SMM by triggering a system management interrupt. This disclosure provides a way to remotely execute an update service (e.g., the BIOS LiveUpdate service) by using a network ethernet card as a secured media to temporarily save an update payload and paste it to system memory via direct memory access (DMA) protocol, and then the card securely triggers a non-maskable interrupt (NMI) hold by baseboard management controller (BMC) to x86 host and force x86 host central processing unit (CPU) enter SMM mode to handle the update request. In an example, the disclosed process uses a SHA-256 (Secure Hash Algorithm 256) hash value as the indicator to represent each update request and is also used to derive the host's status, so a management entity is able to track the host status without consuming any additional memory in SMM for version tracking.

Figure 1:
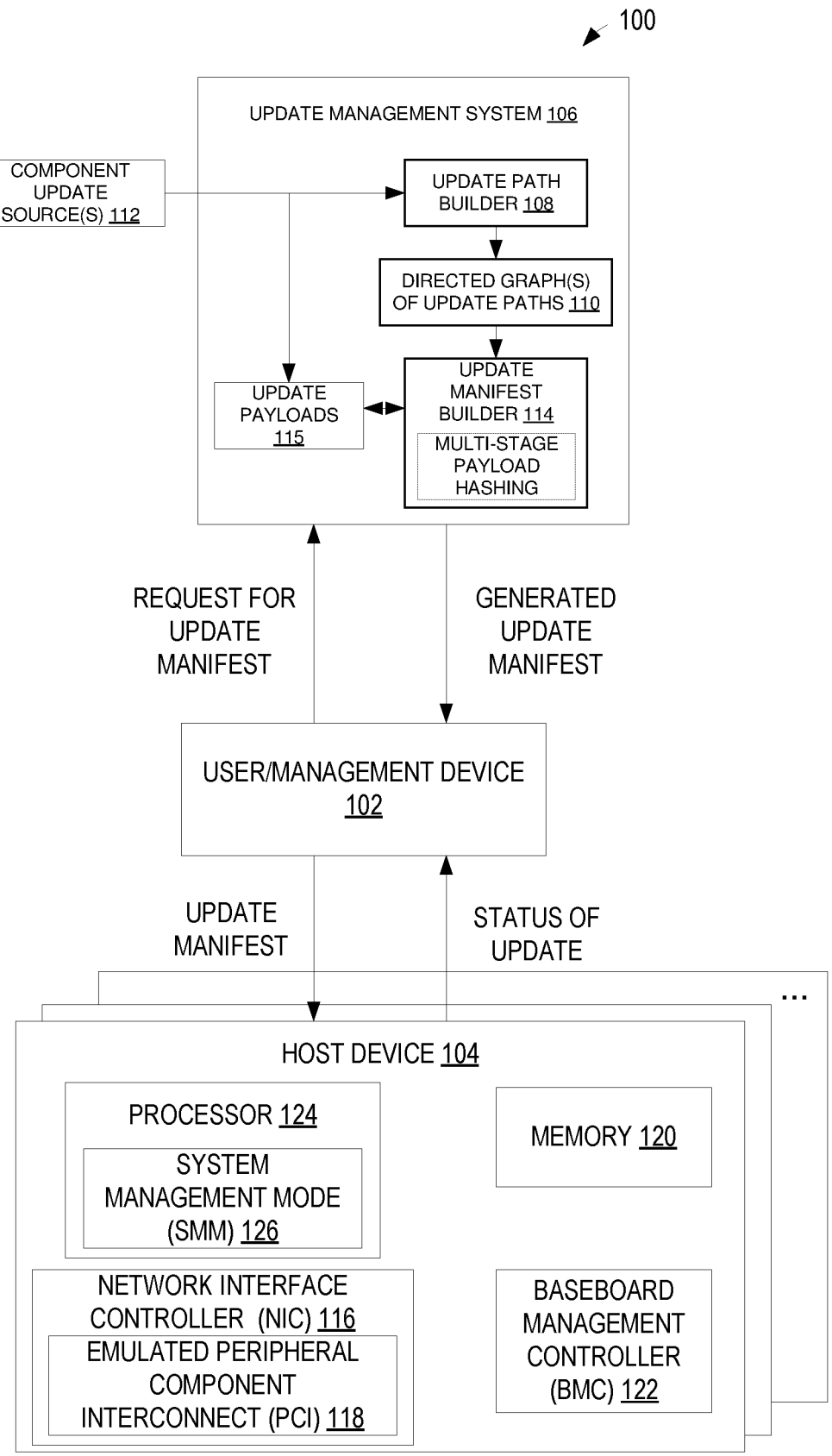
FIG. 1 is a block diagram showing an example environment for updating system components on host devices.

FIG. 1 shows an example update environment 100 in which a user and/or management device 102 coordinates an update process for one or more host devices 104 using an update management system 106. For conciseness, the following description will largely reference updating a single system component for a single host device, however, it is to be understood that the described systems and processes may be implemented in order to coordinate the updating of multiple system components and/or multiple host systems, such as a fleet of servers in a network (e.g., a compute service provider network) and/or an on-premises data center. As used herein, a system component may include any upgradable or updatable component of a host device (e.g., a server computer), including software and firmware, such as a hypervisor, drivers, operating system, etc. In some examples, a system component may correspond to a system image (e.g., a serialized copy or representation of an entire or partial state of a computer system stored as a file).

The update management system 106 may include an update path builder 108 configured to build, update, and manage one or more directed graphs of update paths 110 using version information of updates to one or more system components for the host devices 104. The updates may be received via one or more update sources 112.

The update payloads for fixing system hardware, firmware, and/or software contexts may be generated on an ad-hoc basis at different times. Further, for each host, the update payloads that are appropriate for the host devices may be based off of loaded firmware versions of the host devices, the host device's uptime, and/or the age of the firmware on the host device. However, these factors may cause countless combinations in update paths. This increases the effort on a backend service (e.g., an update management service, such as update management system 106), which is used to tell the host device the feasible update path and associated payloads. In order to address this complexity, the directed graphs 110 are continuously updated as new updates are received from the update source(s) 112 in order to maintain a navigable resource for identifying an update path for a current state of a host device and generating payloads for updating the host device according to the identified update path. An example directed graph and update process is described in more detail below with respect to FIG. 4.

When an update is to be propagated to the host device 104, the user and/or management device 102 may request an update manifest from the update management system 106. The update management system 106 may utilize an update manifest builder 114 to access the directed graphs 110 (e.g., a directed graph associated with a system component to be updated) based on parameters of the request, and generate an update manifest including one or more payloads derived from the directed graph.

For example, the update management system 106 may utilize information about a current state of the host device 104 (e.g., a sequence number and/or a payload hash for a current version of the sub-component on the host device), which may be received via the request for the update manifest, to perform a multi-stage hashing operation using payloads associated with the initial/current version of the sub-component, the final (updated) version of the sub-component, and any updated versions that fall between the initial and final versions along a selected update path in the directed graph. For example, the multi-stage hashing operation may include combining a payload hash for a payload associated with an original (e.g., initial) version of the sub-component in the host device at the time of updating, and a payload hash for a payload associated with a next updated version of the sub-component along the selected update path in the directed graph. The combination may include performing a logical operation on the payload hashes, such as an XOR operation, an XNOR operation, or another reversible function/algorithm, in order to create a traceable path through the updates. The above-described combination process may be iteratively performed using the result of an immediately prior combination to combine with a next payload hash associated with a next version of the sub-component according to the selected update path in the directed graph, until a combination with a payload hash corresponding to a final (e.g., targeted) update version is made. In this way, the update path may be derivable from the result of the multi-stage hashing operation and the update may be rolled forward or backward depending on a result of an update process and the host device. The update manifest builder 114 may retrieve the payloads from the update payload storage 115 (which stores update payloads received from the component update sources 112) and provide the generated update manifest to the user/management device 102 for propagation to the host device.

After receipt of the update manifest from the update management system 106, the user/management device 102 may then send the update manifest to the host device 104 to cause the host device to update the system component according to the update manifest. For example, the user/management device 102 may run an operation, such as a command line tool in some examples, to securely connect to a network card 116 of the host device by authenticating a user's identity. Where a command line tool or other operation is described herein, it is to be understood that the associated operation may be performed in any suitable manner, the command line tool or other operation providing one illustrative example thereof. The user/management device 102 may further run a command line tool or other operation to securely upload the update manifest and payload files received from the update management system 106 to a storage module of the network card 116.

The user/management device 102 may then run a command line tool or other operation to call a software emulated peripheral controller interface (PCI) device 118 on the network card to check to see if the update request is for the host and/or otherwise valid and compatible with the host by checking the revision of the update request against a current version of the system component (e.g., to see if the sequence number of the revision is greater than the sequence number of the current version of the system component) and/or checking an integrity of the update request. If the request passes the check, the network card 116 may create a nonce for the user and tag the manifest file with the nonce.

The user/management device 102 may run a command line tool or other operation and append the nonce obtained from the host device to call the software-emulated PCI device 118 on the network card 116 to load the payload file to system memory 120 through direct memory access (DMA). This may trigger the baseboard management controller (BMC) 122 to provide a non-maskable interrupt (NMI) event to the host (e.g., to a processor 124), causing the update process to be performed at the host device by causing a system management mode 126 of the processor 124 to execute to update the component using the payload stored in memory 120.

The host device 104 may perform a check after updating to ensure that the update has completed as expected (e.g., comparing a current sequence number to the sequence number of the update manifest to determine if there is a match, where a match indicates that the update was successful and a mismatch indicates that the sub-component was not updated properly). An output of this check may be provided to the user/management device 102 as a status of the update.

Figure 2:
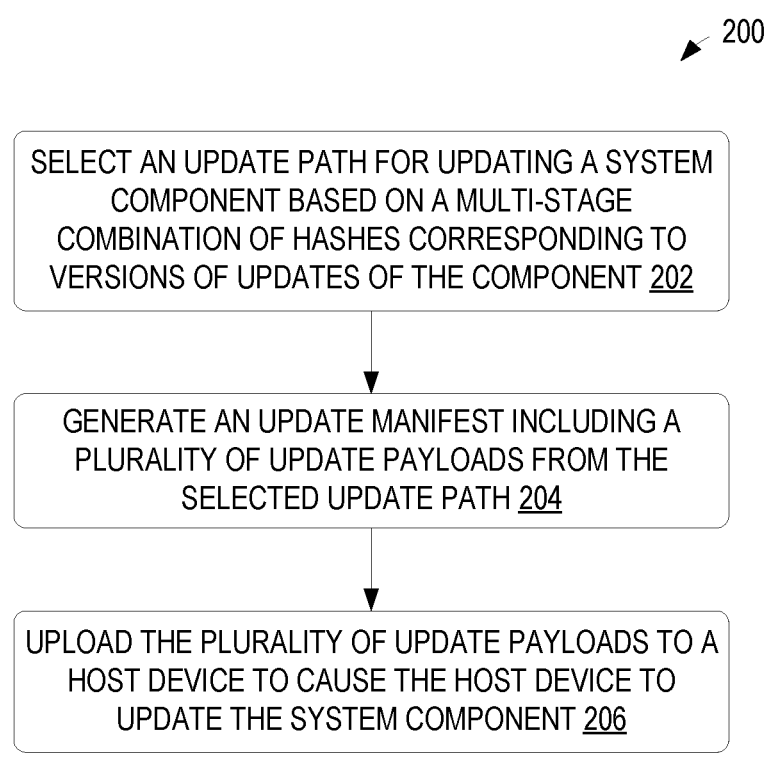
FIG. 2 is a flow chart of an example method of managing updates for a host device.

FIG. 2 shows a flow chart of an example method 200 of updating a system component of a host device. For example, method 200 may be performed in order to update the host device 104 of FIG. 1 and may be performed by the user/management device 102 and/or the update management system 106 of FIG. 1. At 202, the method includes selecting an update path for updating a system component of the host device based on a multi-stage combination of hashes corresponding to versions of updates of the system component. For example, as described above, versions of the system component, starting with an initial version of the system component that is currently included in the host device and ending with a targeted version of the system component to which the system component of the host device is to be updated, may be iteratively combined (e.g., using an XOR operation, an XNOR operation, or another reversible function) to determine an update path to be followed for updating the host device.

At 204, the method includes generating an update manifest including a plurality of update payloads from the selected update path. For example, the plurality of update payloads may include all of the update payloads in the selected update path.

At 206, the method includes uploading the plurality of update payloads to the host device to cause the host device to update the system component (e.g., to the targeted version described above). In this way, the system component may be updated in a coordinated manner to ensure that any updates in between the targeted version and the current version of the system component are provided (thereby reducing update mismatches and errors).

Figure 3:
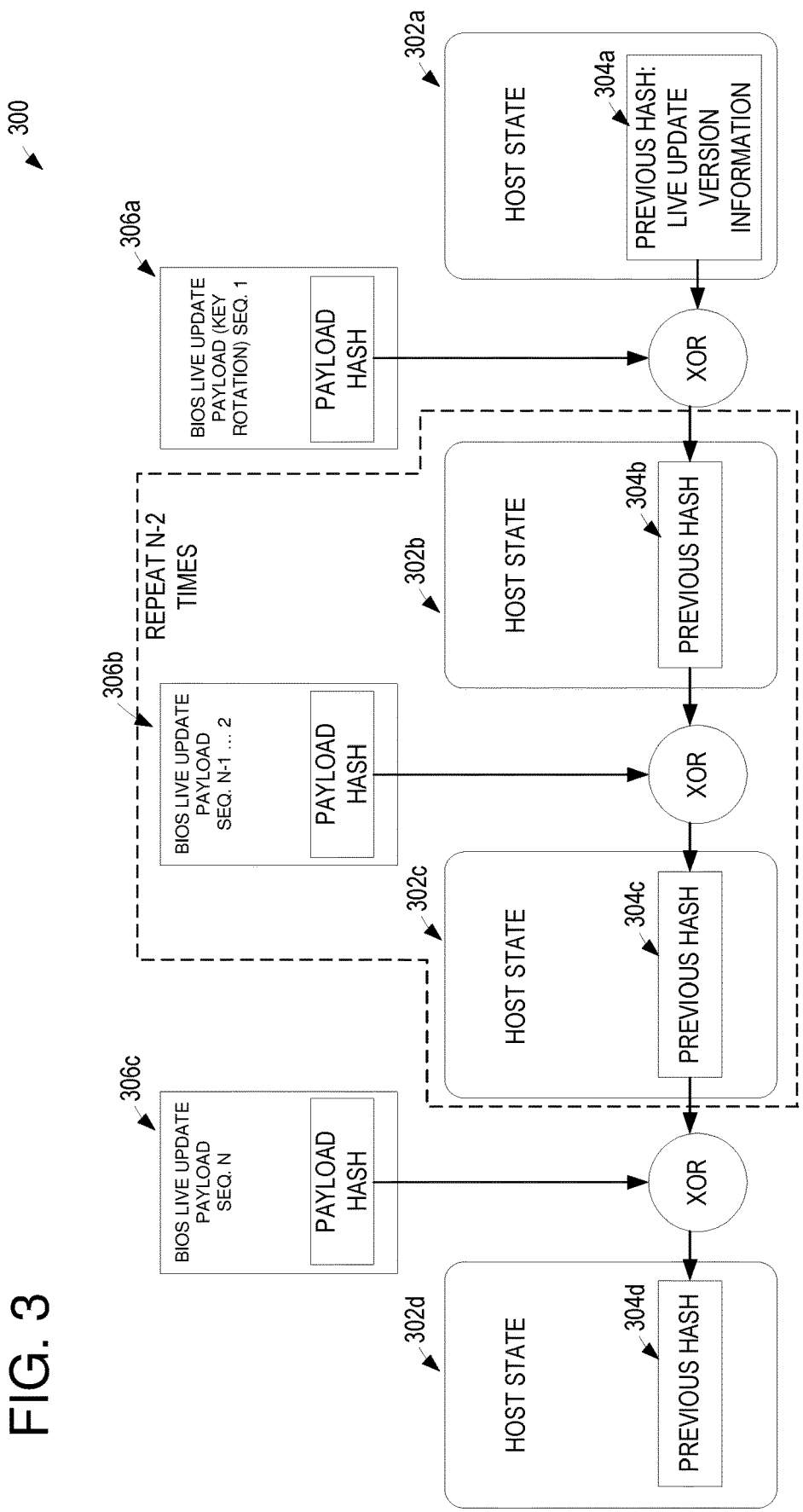
FIG. 3 is an example diagram of a process of creating a traceable path of updates for a host device.

FIG. 3 is a diagram 300 showing an example multi-stage reversible function applied to component updates to represent a history of updates for a host device. As shown, an initial host state 302a (e.g., an initial state of a host device, such as host device 104 of FIG. 1) may be represented by a previous hash 304a of live update version information for a component of the host device. When the component is updated with a first update version of the component, represented by payload 306a, a hash of the payload 306a is combined with the hash 304a of the current version in the host device (e.g., using the XOR operation in the illustrative example) to derive the "previous hash" value 304b of a next host state 302b. This process is iteratively repeated for each of N updates (where N is an integer sequence number, representing the number of update versions applied to the host device to update the component) until a final update payload 306c is applied and used to generate the final hash 304d of the most up-to-date host state 302d.

In this way, the hash 304d has a value that enables each stage of update shown in diagram 300 to be derived, by reversing the XOR function using the update payload hashes. Reversing the XOR function may be performed to determine whether an update was skipped (e.g., if reversing the XOR function leads to a mismatch in one of the previous hashes 304a-c, the sequence number of the update that led to the mismatch may be identified as a missing update that was not applied to the host device).

Figure 4:
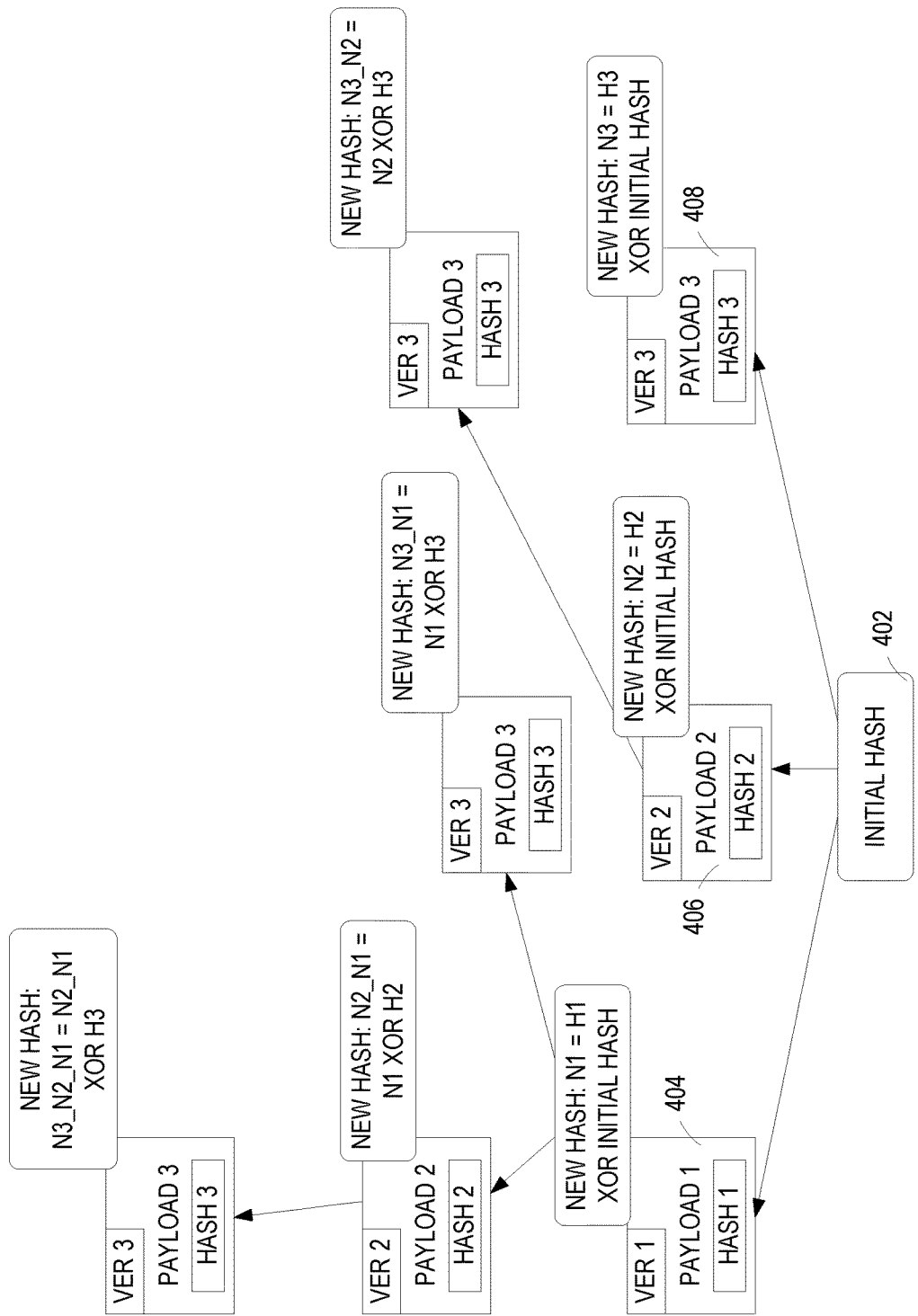
FIG. 4 is an example diagram of a directed graph used to derive an update path for a host device.

FIG. 4 is an example of a directed graph 400 of different update paths for updating a host device. In the illustrative scenario depicted in FIG. 4, an initial hash node 402 represents an initial state of a component (e.g., an initial version of the component) of a host device. The graph shows multiple possible update paths to update the host device to version 1 (shown at node 404), version 2 (shown at node 406), or version 3 (shown at node 408), with different possible intervening update options and resulting multi-stage hash combinations.

For example, the host device may be updated to version 3 by applying the updates of versions 1 and 2 prior to applying the update of version 3, which would result in a new hash corresponding to a multi-stage iterative combination of the initial hash, the hash 1 of the payload of the version 1 update, the hash 2 of the payload of the version 2 update, and the hash 3 of the payload of the version 3 update. Alternatively, if it is desired to skip an update, such as update version 2, an update path that traverses from version 1 directed to version 3 may be applied, where the resulting hash would correspond to a multi-stage iterative combination of the initial hash, the hash 1 of the payload of the version 1 update, and the hash 3 of the payload of the version 3 update. If, for example, an update is applied according to a selected update path and results in issues with the operation of the system, the directed graph 400 may be used to trace the update path and roll back the update to a prior successful update. In such examples, the unsuccessful update may be tracked so that an update path that skips that update may be selected in future update requests.

For each node in the graph, there is a nil hash field to identify the current chained hash in the node and a unique sequence number assigned in the release process for the update associated with that node. For example, the nil hash fields are represented in FIG. 4 as "New Hash." When a new update payload is received at a system that manages the directed graph, the directed graph may be updated to add a new update payload according to the following algorithm: Given a new payload with a sequence number {Seq X} and a payload hash P(n), for each node in the graph, if node T is the node with the initial hash, then create a new node in the graph, set a parent node link to the initial hash node, and set a nil hash to the initial hash XOR P(n). If node T is an existing node in the graph with sequence number {Seq T}, nil hash H(T) and {Seq T} is smaller than {Seq X}, then create a new node in the graph, set a parent node link to the initial hash node, and set a nil hash to H(T) XOR P(n). It is to be understood that the XOR operation is an illustrative example, and a similar process may be performed using XNOR or another reversible function in other examples.

The directed graph 400 may be used to map update paths for updating any number and combination of system components. As new updates are received, new nodes are created in the graph corresponding to the addition of the new updates to the existing paths and the creation of new paths including the new updates. In order to ensure compatibility of updates of some sub-components with existing versions of other sub-components, the graph may be maintained so as to remove, edit, or flag update paths that include incompatible updates (e.g., an update to a sub-component that will cause a loss of functionality of a system if installed according to the update path). In some examples, update compatibilities may be known to a control device and used to control the update paths in which the update is placed when creating new nodes in the directed graph. In this way, when choosing an update path for updating a system, current versions of sub-components on the system may be used to determine which update path(s) include compatible updates. Likewise, the directed graph may be used to roll back a system to a previous state, as described above, if a new update is determined to cause a loss of functionality when installed due to incompatibilities with other sub-components of the system.

Figure 5:
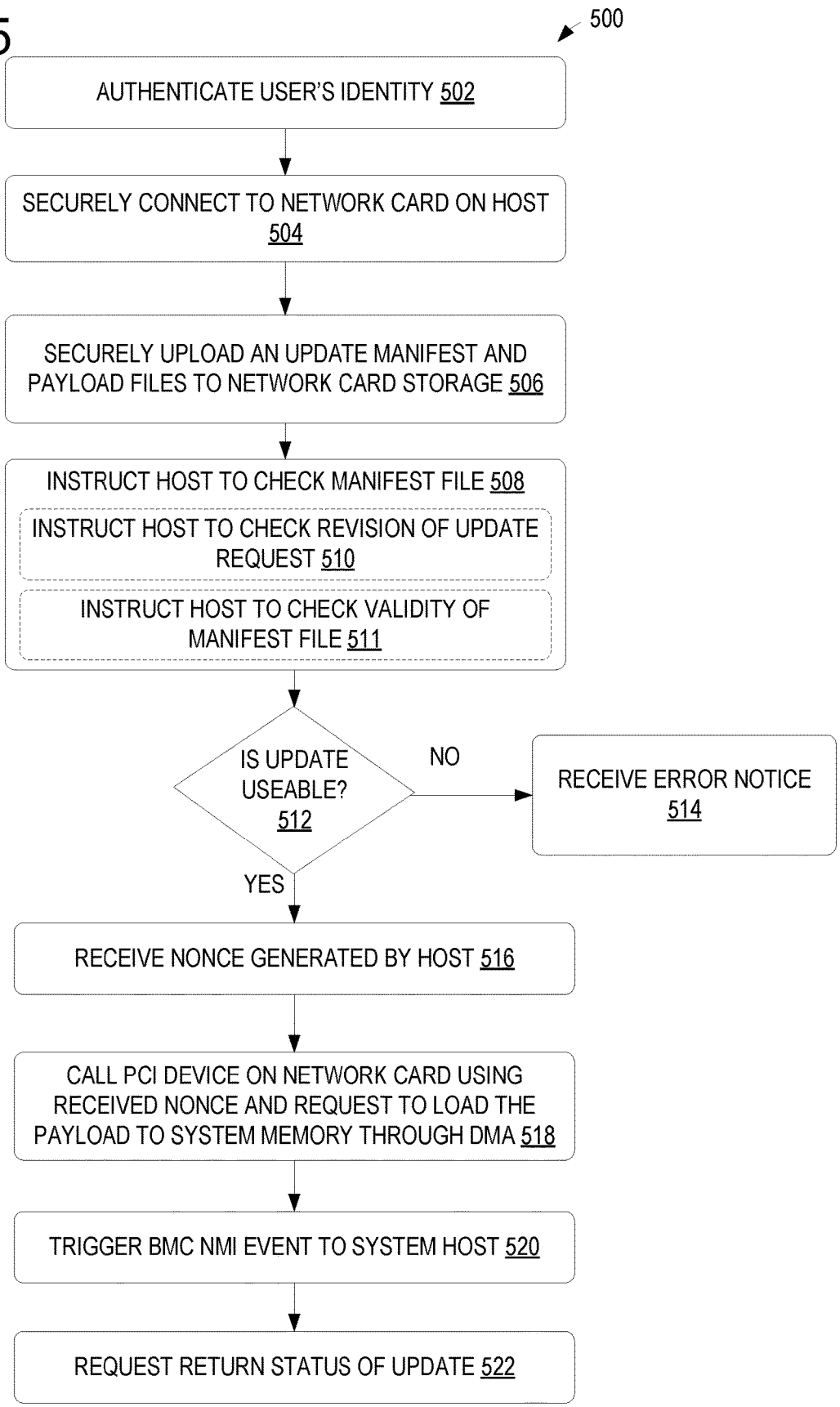
FIG. 5 is a flow chart of an example method of providing an update to a host device and controlling the update of the host device accordingly.

FIG. 5 is a flow chart of an example method 500 for updating a host device and verifying the update. For example, method 500 may be performed by the user/management device 102 of FIG. 1 in coordination with the host device 104 and the update management system 106. At 502, the method includes authenticating a user's identity. In this way, the system may ensure that only authorized individuals are able to update the host device.

At 504, the method includes securely connecting to a network card of the host device. Although described herein with reference to a network card, it is to be understood that the method may be performed using any suitable offload card (e.g., a peripheral component that offloads processing activities from the host central processing unit) and associated components instead of or in addition to the network card and associated components. The secure connection may allow the user/management device to securely upload an update manifest and payload files to the network cards storage, as indicated at 506. For example, the update manifest may include update payloads from an update path of a directed graph (an example of which is described above with respect to FIG. 4) that is selected based upon a current state of the host device and one or more other parameters of an update request (e.g., the request may specify skipping a particular update, such as an update known or suspected to cause issues with the host device operations).

At 508, the method includes instructing the host device to perform a data integrity check on the manifest file to confirm validity and compatibility with the host device. For example, the host device may perform a first check to ensure that the sequence number of the update payloads in the update manifest are greater than or equal to a current sequence number of a current version of the component to be updated, as indicated at 510. In other examples, the check may include confirming that the payload data is valid and has not been tampered with (e.g., performing a security check, checking a signature, etc.) and/or is not corrupted (e.g., performing a check for data transmission errors or other conditions leading to a loss or alteration of data), as indicated at 511.

At 512, the method includes determining if the update is useable (e.g., if the update passed the check of 508 and is compatible with the system, is a targeted revision, is valid, etc.). If the update is not useable (e.g., "NO" at 512), the method processed to 514 to receive an error notice from the host device and the user/management device may either attempt to resend the payload data of the update manifest or cancel the update. If the update is useable (e.g., "YES" at 512), the method proceeds to 516 to receive a nonce generated by the host device. For example, the nonce may be a confirmation to ensure that further operations a requested by the user/management device that provided the update manifest.

At 518, the method includes calling a software-emulated peripheral component interconnect (PCI) on the network card using the received nonce and requesting to load the payload to system memory (e.g., moving the payload data from the network card storage to system memory) through direct memory access (DMA).

At 520, the method includes instructing the host device to trigger the baseboard management controller (BMC) to provide a non-maskable interrupt (NMI) event to a processor of the host device. This process may be performed in order to cause the processor to complete the update process using the payload data loaded in system memory. At 522, the method includes requesting a return status of the update process.

Figure 6:
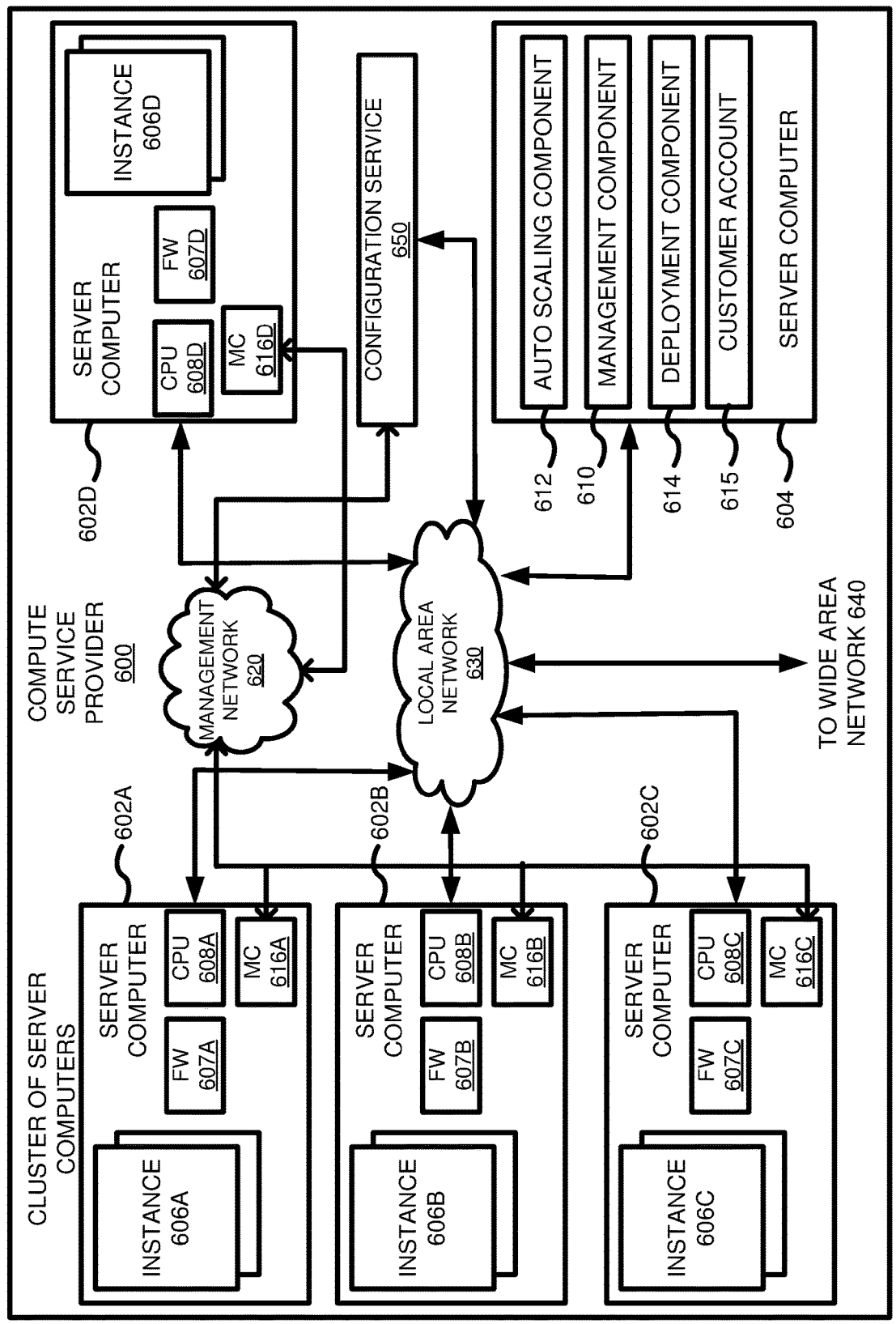
FIG. 6 is an example system diagram showing a plurality of virtual machine instances running in the multi-tenant environment.

As described above, the disclosed update system may be implemented in a cloud computing or other distributed computing environment in some examples. FIG. 6 is a system diagram showing an example of a plurality of virtual machine instances running in a multi-tenant environment. More specifically, FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients.

In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e., a computer) that executes applications like a physical machine. In the example, each of the server computers 602A-602D can be configured to execute a hypervisor or another type of program configured to enable the execution of multiple instances 606 on a single server. For example, each of the servers 602A-602D can be configured (e.g., via the hypervisor) to support one or more virtual machine partitions, with each virtual machine partition capable of running a virtual machine instance (e.g., server computer 602A could be configured to support three virtual machine partitions each running a corresponding virtual machine instance). Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The server computers 602A-602D can be different system types having different bills of materials with some common and some different hardware and software components. For example, a common motherboard can be used for each of the different server computers and different speed CPUs can be inserted in respective sockets of the different server computers. The management controllers 616A-616D can be communicatively coupled to a management network 620, where each of the respective management controllers 616 can have a different IP address.

The management controllers can communicate with a configuration service 650 to receive firmware and/or configuration software updates. Specifically, the configuration service 650 can include suitable logic, circuitry, interfaces, and/or code and can be operable to communicate with the management controllers 616 using the management network 620. For example, the configuration service 650 can receive requests from the management controllers 616 for firmware and/or configuration software modules and the configuration service 650 can respond by sending the requested modules to the management controllers 616.

The configuration service 650 can also be used for monitoring a status of the server computers 602A-602D. For example, the configuration service 650 can receive messages from the server computers 602A-602D concerning configuration details (such as a successful or failed self-test) and other operational status of the system. Based on an analysis of the received messages, the configuration service 650 can issue an alert to a system administrator to repair or analyze one or more components of the system. The configuration service 650 can be implemented in a dedicated server (similar to the servers 602A-602D), or can be implemented as part of a server computer 604 that performs management functions. For example, the configuration service 650 may be implemented as part of a management component 610.

The management controller can update the firmware 607 prior to a host CPU 608 being connected to a local area network (LAN) 630. For example, the host CPU 608 can be powered down or held in reset while the management controller updates the firmware 607. As another example, network services for the host CPU 608 can be started after the firmware 607 is updated. The host CPU 608 can have an independent IP address separate from an IP address of its associated management controller 616. Thus management traffic can be communicated over a management plane on the management network 620 and data traffic can be communicated over a data plane on the local area network 630. Alternatively, the networks 620 and 630 can be combined. The local area network 630 can be connected to a wide area network (WAN) 640 so that end-users can access the compute service provider 600. It should be appreciated that the network topology illustrated in FIG. 6 has been simplified and that many more networks and networking devices can be utilized to interconnect the various computing systems disclosed herein.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component 610 can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

Figure 7:
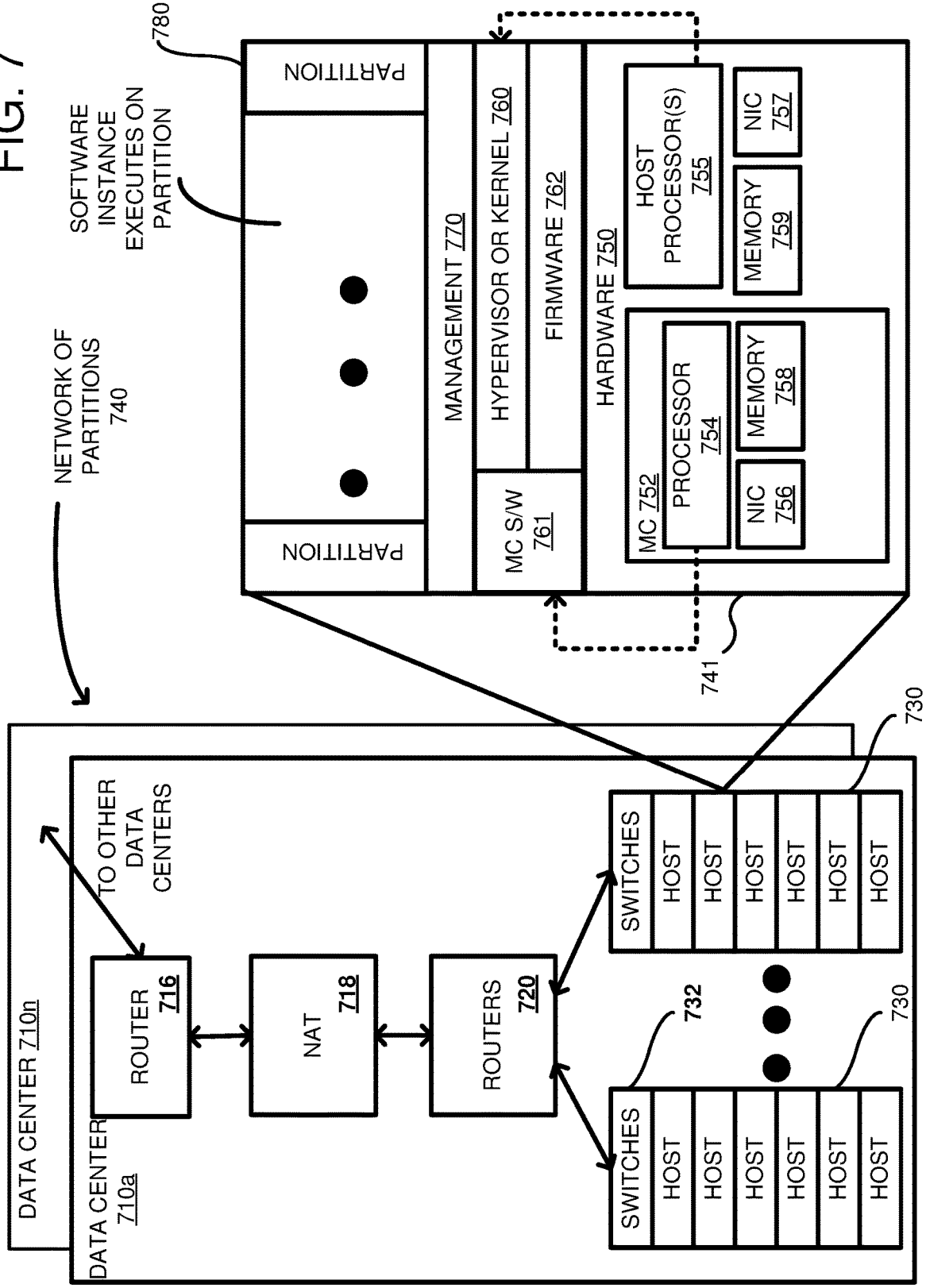
FIG. 7 shows an example of a plurality of host computers, routers and switches, which are hardware assets used for running virtual machine instances.

FIG. 7 shows an example of a plurality of host computers, routers, and switches—which are hardware assets used for running virtual machine instances—with the host computers using a management controller (MC) to configure firmware and/or configuration software of the host computer, according to one embodiment. More specifically, FIG. 7 illustrates the network of partitions 740 and the physical hardware associated therewith. The network of partitions 740 can include a plurality of data centers, such as data centers 710a-710n, coupled together by routers, such as router 716. The router 716 reads address information in a received packet and determines the packet's destination. If the router decides that a different data center contains a host server computer, then the packet is forwarded to that data center. If the packet is addressed to a host in the data center 710a, then it is passed to a network address translator (NAT) 718 that converts the packet's public IP address to a private IP address. The NAT 718 also translates private addresses to public addresses that are bound outside of the data center 710a. Additional routers 720 can be coupled to the NAT 718 to route packets to one or more racks 730 of host server computers. Each rack 730 can include a switch 732 coupled to multiple host server computers. A particular host server computer is shown in an expanded view at 741.

Each host 741 has underlying hardware 750 including one or more CPUs (e.g., host processor 755), memory (e.g., memory 759), a network interface card (NIC) 757, storage devices, etc. The hardware layer 750 can implement the hardware elements of the host 741 (e.g., host processor 755, NIC 757, and memory 759), as well as a management controller (MC) 752 (which may be the same as the management controllers 616A-D of FIG. 6). Each management controller 752 can include a MC processor 754, memory 758, and a NIC 756, all being part of the hardware layer 750. The management controller NIC 756 can be used for communicating with a management network (such as the management network 620).

The management controller 752 can execute management controller software (MC S/W) 761 (using the memory 758) in layers above the hardware layer 750. For example, the MC software 761 can include a boot loader, an operating system, initialization software, and/or various management programs. The management controller software may include software that is to be updated according to one or more of the example update processes described herein. In some examples, the initialization software can be used to download or retrieve software modules associated with an update for one or more system components, such as the above-described software components, a hypervisor, one or more drivers for the system, firmware of the system, etc. For example, the downloaded or retrieved software modules can be used for updating firmware 762. The management controller 752 can update the firmware 762 prior to booting the host processor 755 and/or as part of an initialization sequence of the host processor 755.

Running above the hardware layer 750 of the host processor 755 is firmware 762 (such as BIOS) and a hypervisor or kernel layer 760. The hypervisor or kernel layer 760 can be classified as a type 1 or type 2 hypervisor. A type 1 hypervisor runs directly on the host hardware 750 to control the hardware and to manage the guest operating systems. A type 2 hypervisor runs within a conventional operating system environment. Thus, in a type 2 environment, the hypervisor can be a distinct layer running above the operating system and BIOS or firmware 762, and the operating system and BIOS or firmware 762 interact with the system hardware. Different types of hypervisors include Xen-based, Hyper-V, ESXi/ESX, Linux, etc., but other hypervisors can be used. A management layer 770 can be part of the hypervisor or separated therefrom and generally includes device drivers needed for accessing the hardware 750. The partitions 780 are logical units of isolation by the hypervisor. Each partition 780 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 770, which can then pass the metrics to a configuration service (e.g., 650) for storage in a metrics database. Additionally, the management layer 770 can pass to a monitoring service the number of instances that are running, when they were launched, the operating system being used, the applications being run, etc. All such metrics can be used for consumption by the health monitoring service and stored in a database for subsequent use.

Figure 8:
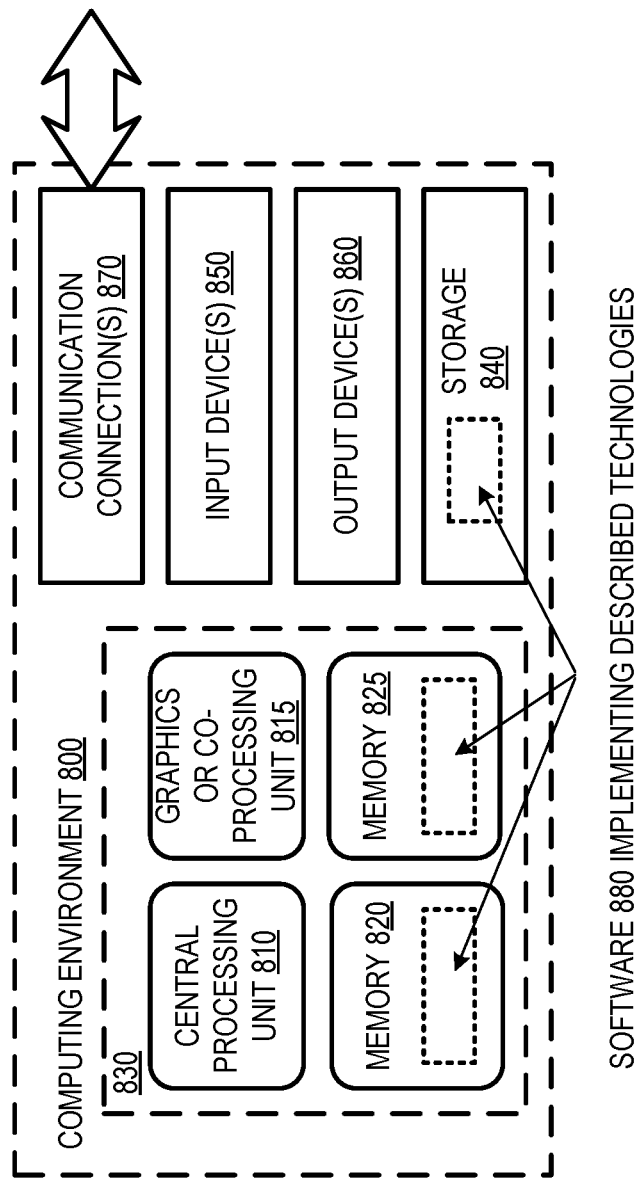
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.) included in any of a variety of computing environments (e.g., cloud computing environments, non-cloud computing environments, or mixed computing environments).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of coordinating system component updates for a host device, the method comprising:
   receiving update information from an update source including payloads for a plurality of versions of updates for a system component, each version having a different sequence number;
   generating a directed graph of system component updates, the directed graph representing a plurality of update paths, each path culminating in a different hash value derived from performing a multi-stage iterative combination of hashes of payloads in the update paths using an XOR operation;
   generating an update manifest for updating the host device, the update manifest including a plurality of update payloads for system component updates in a selected update path of the directed graph, the selected update path being selected based on a current state of the system component in the host device; and
   outputting the update manifest to cause the host device to update the system component in accordance with the update manifest.

2. The method of claim 1, wherein the selected update path is further selected based on a parameter of an update request for the host device, the parameter including a request to skip a selected update payload.

3. The method of claim 1, further comprising receiving an indication of an unsuccessful update and, in response, identifying a last successful update of the system component in the host device using the directed graph and outputting a new update manifest to cause the host device to roll back the system component to the last successful update.

4. The method of claim 1, further comprising receiving a new update payload for inclusion in the directed graph and, in response, updating the graph by creating a new node in the graph corresponding to the new update payload and deriving new hash combinations for each update path that includes the new node.

5. A method, comprising:
   generating an update manifest including a plurality of update payloads for a system component that are included in an update path, the update path selected or derived based on a multi-stage combination of a hash of an update payload corresponding to a current version of the system component and respective hashes of the plurality of update payloads using a reversible function; and
   uploading the plurality of update payloads to a host device that includes the system component to cause the host device to update the system component based on the generated update manifest.

6. The method of claim 5, wherein the reversible function comprises a logical XOR operation or a logical XNOR operation.

7. The method of claim 5, wherein the system component comprises a software component of the host device.

8. The method of claim 5, wherein the system component comprises firmware of the host device.

9. The method of claim 5, wherein the update path is selected using a directed graph that maps all possible update paths for updating the system component.

10. The method of claim 9, wherein each node of the directed graph includes an indication of an associated hash combination, wherein for each node the associated hash combination is derived by performing N stages of iteratively combining hashes of payloads along an update path that culminates in the node, wherein the node has a distance of N from an initial state of the system component.

11. The method of claim 5, wherein the selected update path includes N update payloads, and wherein the multi-stage combination of hashes of payloads comprises iteratively performing N XOR or XNOR operations for successive hash combinations, where a first hash combination corresponds to applying the XOR or XNOR operation to an initial hash of an initial payload corresponding to an initial state of the system component and a first hash of a first payload in the update path.

12. The method of claim 5, further comprising instructing the host device to check the update manifest for validity.

13. The method of claim 12, wherein checking the update manifest for validity includes comparing a respective version of each of the update payloads in the update manifest with a current version of the system component on the host device.

14. The method of claim 13, wherein the method further comprises receiving an indication of an error responsive to the host device determining that at least one of the update payloads in the update manifest has a respective version that is lower than the current version of the system component on the host device.

15. The method of claim 12, wherein checking the update manifest for validity includes checking a data integrity of the update payloads in the update manifest.

16. A host device, comprising:
a peripheral device;
a baseboard management controller (BMC);
one or more processors; and
a storage device storing instructions executable by the one or more processors to:
  receive, at the peripheral device, an update manifest including a plurality of update payloads for a system component that are included in an update path of a data structure representing possible updates of the system component, the update path selected or derived based on a multi-stage combination of a hash of an update payload corresponding to a current version of the system component and respective hashes of the plurality of update payloads using a reversible function;
  perform a validity check of the update manifest; and
  responsive to confirming validity of the update manifest, transfer the plurality of update payloads to the storage device and generate an interrupt at the BMC triggering an update process according to the update manifest.

17. The host device of claim 16, wherein the update manifest is received from a management device and the peripheral device includes a software-emulated peripheral component interconnect (PCI).

18. The host device of claim 17, wherein, responsive to confirming validity of the update manifest, the instructions are further executable to transmit an indication of the confirmation of validity to the management device and transfer the plurality of update payloads to the storage device responsive to an instruction received from the management device that references the confirmation.

19. The host device of claim 16, wherein the instructions are further executable to output a result of the update process, the result including an indication of whether the system component is updated in accordance with the update manifest.

20. The host device of claim 16, wherein the host device is one of a plurality of host devices in a network and wherein the update manifest is one of a plurality of update manifests that are respectively transmitted to each of the plurality of host devices for updating the system component in each of the plurality of host devices.

* * * * *